United States Patent [19]

Gariboldi et al.

[11] Patent Number: 5,119,263

[45] Date of Patent: Jun. 2, 1992

[54] NEGATIVE OVERVOLTAGE PROTECTION CIRCUIT FOR INSULATED VERTICAL PNP TRANSISTORS

[75] Inventors: Roberto Gariboldi, Milan; Alberto Gola, Pavia, both of Italy

[73] Assignee: SGS-Thomson Microelectronics S.r.l., Agrate Brianza, Italy

[21] Appl. No.: 593,427

[22] Filed: Oct. 5, 1990

[30] Foreign Application Priority Data

Oct. 9, 1989 [IT] Italy .................. 21965 A/89

[51] Int. Cl.$^5$ ............................ G05F 1/569
[52] U.S. Cl. ........................ 361/18; 361/91; 323/276
[58] Field of Search ............ 361/88, 91, 59, 60, 361/111, 18, 15; 307/300, 350, 360; 323/284, 285, 276, 316

[56] References Cited

U.S. PATENT DOCUMENTS

| | | | |
|---|---|---|---|
| 3,173,078 | 3/1965 | Farnsworth | 361/18 |
| 4,254,372 | 3/1981 | Moore, Jr. | 361/18 |
| 4,495,536 | 1/1985 | Bynum | 361/91 |
| 4,782,280 | 11/1988 | Lommers | 323/276 |

Primary Examiner—A. D. Pellinen
Assistant Examiner—C. Schultz
Attorney, Agent, or Firm—Guido Modiano; Albert Josif

[57] ABSTRACT

A negative overvoltage protection circuit for an insulated vertical PNP transistor the emitter whereof defines the input, the collector whereof defines the output and the base whereof is connected to an NPN driving transistor. In order to maximally extend the negative overvoltage which can be applied to the output, the protection circuit comprises an output voltage sensor, a voltage reference, a comparator which is connected in input to the voltage reference and to the sensor and generates in output an activation signal when the output voltage of the PNP transistor becomes smaller than the reference, a switch which is controlled by the comparator to switch off the NPN driving transistor upon the reception of the activation signal and a low-impedance circuit which is connected between the emitter and the base of the insulated vertical PNP transistor and is activated by the activation signal, in a manner suitable for bringing the insulated vertical PNP transistor practically to $BV_{CBO}$.

13 Claims, 2 Drawing Sheets 5,119,263

NEGATIVE OVERVOLTAGE PROTECTION CIRCUIT FOR INSULATED VERTICAL PNP TRANSISTORS

BACKGROUND OF THE INVENTION

The present invention relates to a negative overvoltage protection circuit for insulated vertical PNP transistors.

As known, insulated vertical PNP transistors, by virtue of their relative advantages with respect to lateral PNP transistors (i.e. higher gain, higher cutoff frequency, smaller bulk) are preferred over the latter in applications. A low-drop control circuit is quite often used with said insulated vertical transistors (low-drop configuration), as shown in FIG. 1. As can be seen, the PNP transistor, indicated by $Q_P$, has an emitter which defines the input terminal which receives the input voltage $V_{IN}$, a collector which defines the output terminal on which the voltage $V_{OUT}$ is present and a base which is connected to the collector of an NPN transistor $Q_N$ the emitter whereof is connected to the ground and the base whereof is connected, by means of a current source $I_g$, to the input terminal or to a reference voltage source.

This (circuital) configuration is used for example in low-drop regulators, in driving devices which operate as switches for inductive loads, such as relays ("high-side drivers") or in controlled switches.

In all these applications, the need often arises to be able to connect the output $V_{OUT}$ to the ground or to a more negative voltage of the substrate. However, this entails problems due to the physical execution of the insulated vertical PNP transistor. Said transistor is in fact executed in the manner illustrated in FIG. 2, wherein the reference numeral 1 indicates the P-type substrate which is connected to the ground, the reference numeral 2 indicates the N-type epitaxial layer, the reference numeral 3 indicates the junction insulation ring which surrounds the portion of epitaxial layer, indicated by 2', which internally accommodates the PNP transistor. In particular, the N+-type buried layer 4, the P-type collector region 5, the N-type base region 6 (formed by a further portion of the epitaxial layer and provided with an N+-type enhanced region 7 to provide the contact) and the P-type emitter region 8 are defined within said portion 2'. The figure also indicates the collector contact C, the base contact B and the emitter contact E, as well as (in broken lines) the parasite structures constituted by the substrate diode $D_s$ which is formed between the insulation 3 and the N+-type enhanced region 9 (on which the contact A is formed), by the Zener diode $D_z$ which is formed between the collector region 5 and the buried layer 4, as well as by the diode D which is formed between the buried layer 4 and the substrate 1, and is therefore anti-series connected to $D_z$.

If the contact A (and therefore the ring formed by the portion 2' of the epitaxial layer) is short-circuited with the collector C, as normally occurs, the substrate diode $D_s$ starts to conduct as soon as the voltage on the collector C drops to approximately $-0.7$ V with respect to the voltage of the substrate (ground).

In order to solve this problem, it is currently preferred to leave the portion 2' floating, i.e. with the terminal A not connected. In this condition, the negative voltage which the output can withstand is related to the breakdown of the Zener diode plus the drop across the diode D (see FIG. 1).

However, even this solution is not free from disadvantages, which are related to the maximum voltage which the vertical PNP transistor can withstand between the emitter and the collector. To clarify this problem, consider for example an insulated vertical PNP transistor diffused with a process for which $BV_{CEO}=20$ V, $BV_{CBO}=30$ V and $BV_{Dz}=15$ V. In this case, if the input voltage $V_{IN}=10$ V, the output voltage $V_{OUT}$ cannot drop below $-10$ V, otherwise the transistor $Q_P$ breaks down for $BV_{CEO}$. Keeping the PNP transistor on when its collector reaches a voltage which is lower than the ground can further more entail several problems.

SUMMARY OF THE INVENTION

Given this situation, the aim of the present invention is to provide a negative overvoltage protection circuit for insulated vertical PNP transistors which is capable of effectively protecting the PNP transistor even at output voltages which are lower than those which can be obtained with known solutions.

Within the scope of this aim, a particular object of the present invention is to provide a protection circuit of the indicated type in which any possible parasite elements do not compromise the operation of the circuit itself.

Another object of the present invention is to provide a protection circuit of the indicated type which can be easily integrated and occupies a small amount of area.

Not least object of the present invention is to provide a protection circuit which has great reliability and does not require, for its manufacture, devices or procedures which differ from those commonly used in the electronics industry.

This aim, the objects mentioned and others which will become apparent hereinafter are achieved by a negative overvoltage protection circuit for insulated vertical PNP transistors, as defined in the accompanying claims.

Substantially, the invention consists of a circuit which senses the voltage of the collector of the PNP transistor and, when said voltage reaches a value which is lower than the ground, switches said transistor off, bringing it to $V_{CEV}$, which is equal to $BV_{CBO}$ minus the drop $V_{CEsat}$ (i.e. it activates a low-resistivity path between the emitter and the base thereof). This configuration corresponds to the insertion of a constant-voltage source which, in a preferred embodiment, has a value which is equal to the collector-emitter drop of a transistor in saturation (on the subject, see P. Antognetti, "Power Integrated Circuits", McGraw Hill 1986, pages 2.16 and 2.17, FIGS. 2-13, with R=0). Since in the present case said drop is very small (typically 100 mV for NPN transistors) and is in any case much smaller than $BV_{CBO}$ (which, as mentioned in the example considered, is equal to 30 V), in practice the PNP transistor operates at $BV_{CBO}$. The range of the negative overvoltage is consequently maximally extended, in practice to the breakdown voltage of the Zener diode associated with the PNP transistor, said voltage being dependent on the manufacturing process employed.

With this solution, and considering an insulated vertical PNP transistor which has the above indicated values, when the input voltage is 10 V the output can reach $-15$ V, instead of $-10$ V, i.e. in practice till the process limit of the Zener diode $D_z$.

BRIEF DESCRIPTION OF THE DRAWINGS

The characteristics and advantages of the invention will become apparent from the description of a preferred embodiment, illustrated only by way of non-limitative example in the accompanying drawings, wherein:

FIG. 5 is a view of a variated embodiment of the circuit of FIG. 3.

DESCRIPTION OF THE PREFERRED EMBODIMENTS

Figure 1:
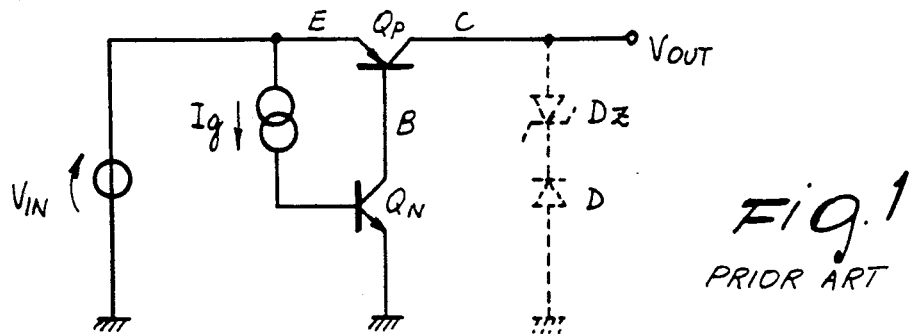
FIG. 1 is an equivalent circuit diagram of the currently used configuration, which comprises a known insulated vertical PNP transistor.
Figure 2:
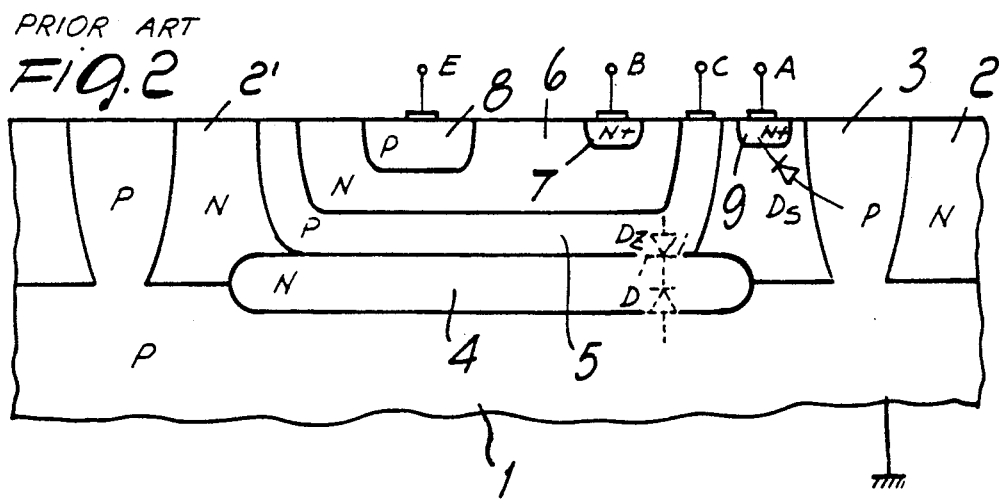
FIG. 2 is a transverse sectional view taken across a silicon chip which integrates a known insulated vertical PNP transistor.
Figure 3:
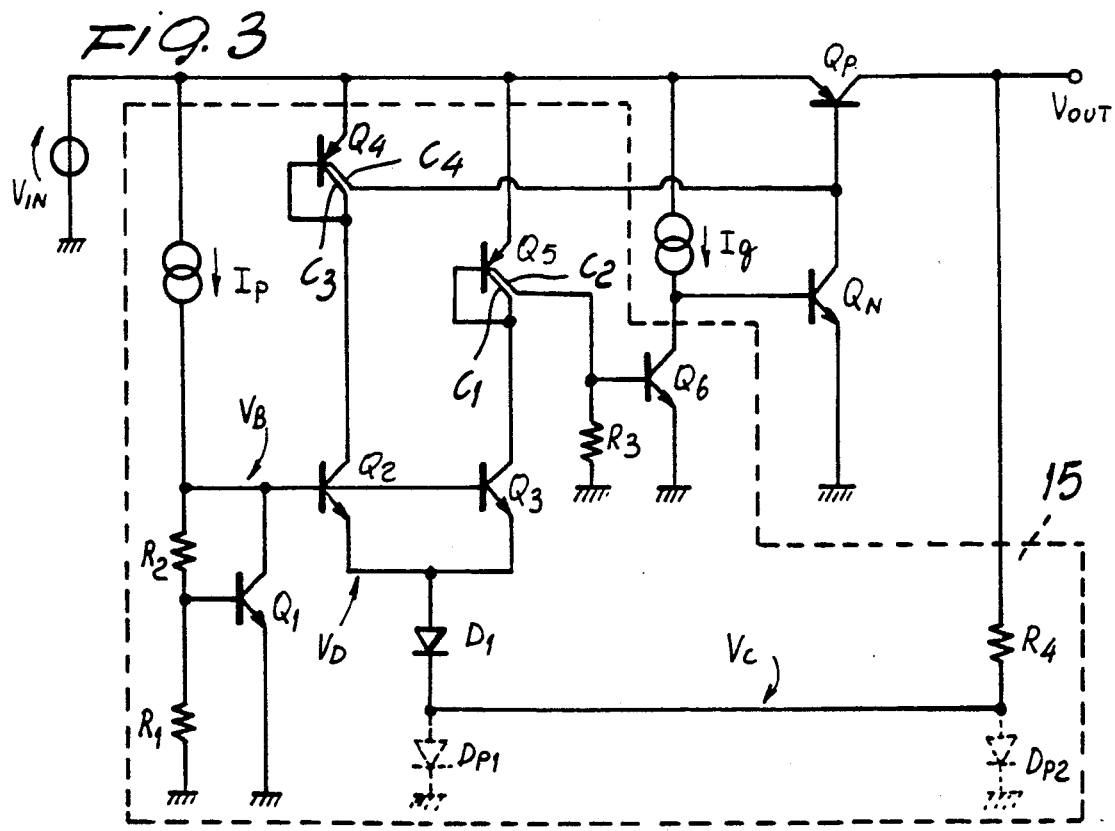
FIG. 3 is a view of the protection circuit according to the invention.

With reference to FIG. 3, the protection circuit according to the invention is applied to the known configuration which has already been illustrated in FIG. 1 and comprises the PNP-type transistor $Q_P$ the emitter whereof defines the input terminal which receives the input voltage $V_{IN}$, the collector whereof defines the output terminal set to the output voltage $V_{OUT}$ and the base whereof is driven by the NPN-type transistor $Q_N$ powered by the current source $I_g$ which is in turn connected to the input terminal or to a reference voltage source. The protection circuit according to the invention has been generally indicated by the reference numeral 15 and substantially comprises an output voltage sensor, a voltage reference, a comparator connected in input to the voltage reference and to the sensor, a switch for the NPN transistor which is controlled by the comparator, and a low-impedance circuit which is also activated by the comparator.

In detail, the output voltage sensor is provided by a resistor $R_4$ which is connected with one terminal to the output so as to detect the output voltage $V_{OUT}$ and with the other terminal to an input of the comparator, which comprises herein a pair of transistors $Q_2$, $Q_3$ and a diode $D_1$. The bases of the transistors $Q_2$ and $Q_3$ are coupled and define a second input of the comparator; the emitters are also coupled and are connected to the anode of the diode $D_1$, the cathode whereof defines the first input of the comparator and is connected to the resistor $R_4$, as already indicated. The collectors of $Q_2$ and $Q_3$ instead define the outputs of the comparator. The voltage reference is formed here by a pair of resistors $R_1$, $R_2$ which are connected in series between a current source $I_p$ (which is furthermore connected to the input terminal or to another reference voltage) and the ground. The intermediate point between these two resistors is connected to the base of an NPN-type transistor $Q_1$, whereas the intermediate point between $R_2$ and the current source is connected to the collector of $Q_1$ and to the base of the transistors $Q_2$ and $Q_3$. In turn, the emitter of $Q_1$ is connected to the ground. $R_1$ and $R_2$ have a preset mutual ratio (in the illustrated example, $R_2 = R_1/2$), so as to constitute a multiplier of the voltage applied to $R_1$ ($V_{be}$). In practice, assuming that $V_{BE}$ is equal to 0.7 V, a voltage $V_B$ equal to $1.5 \cdot V_{be} = 1.05$ V is present on the bases of $Q_2$ and $Q_3$.

The switch of the transistor $Q_N$ is formed here by the transistor $Q_5$, which is of the PNP type, is diode-connected and has a first collector $C_1$ and its base connected to the collector of $Q_3$, its emitter connected to the input terminal and a second collector $C_2$ connected to the base of a transistor $Q_6$ of the NPN type, the emitter whereof is connected to the ground and the collector whereof is connected to the base of $Q_N$. A resistor $R_3$ is furthermore connected between the base of $Q_6$ and the ground. The low-impedance circuit is finally formed by a transistor $Q_4$ of the PNP type which is also diode-connected, has its emitter connected to the input terminal, a first collector $C_3$ and the base connected to the collector of $Q_2$ and a second collector $C_4$ connected to the base of $Q_P$.

The operation of the circuit according to the invention is as follows: during nominal operation, with positive output voltage, and in any case until the output voltage $V_{OUT}$ (and therefore $V_C$) is higher than $-0.35$ V, the drop across the base-emitter junction of $Q_2$ and across $D_1$ is such as to keep $Q_2$ and $D_1$ in the off state and therefore the circuit 15 is switched off. During this step, the diode $D_1$, since it is provided as a base-collector diode, withstands a voltage which is higher than $BV_{EBO}$ and is equal to approximately 0.7 V, and is therefore capable of preventing the breakdown of the base-emitter junctions of $Q_2$ and $Q_3$.

When the output voltage $V_{OUT}$ drops below $-0.35$ V (i.e. $V_B - V_{be,Q2} - V_{D1}$), $Q_2$ and $Q_3$ start to conduct, and so do $Q_4$ and $Q_5$. $Q_5$ delivers current to $Q_6$, which thus switches off the driving transistor $Q_N$, whereas $Q_4$, by saturating, creates a low-resistivity path between the emitter and the base of $Q_P$, sending it to $BV_{CBO} - V_{CEsat}$.

$Q_N$, too, due to the low-resistivity path constituted by $Q_6$, furthermore practically reaches $BV_{CBO}$ (except for the saturation emitter-collector drop of $Q_5$).

The current which flows across $Q_2$ and $Q_3$ is controlled and is equal to:

$$I = \tfrac{1}{2}(V_C - V_{OUT})/R_4 = \tfrac{1}{2}(-0.35V - V_{OUT})/R_4.$$

Figure 4:
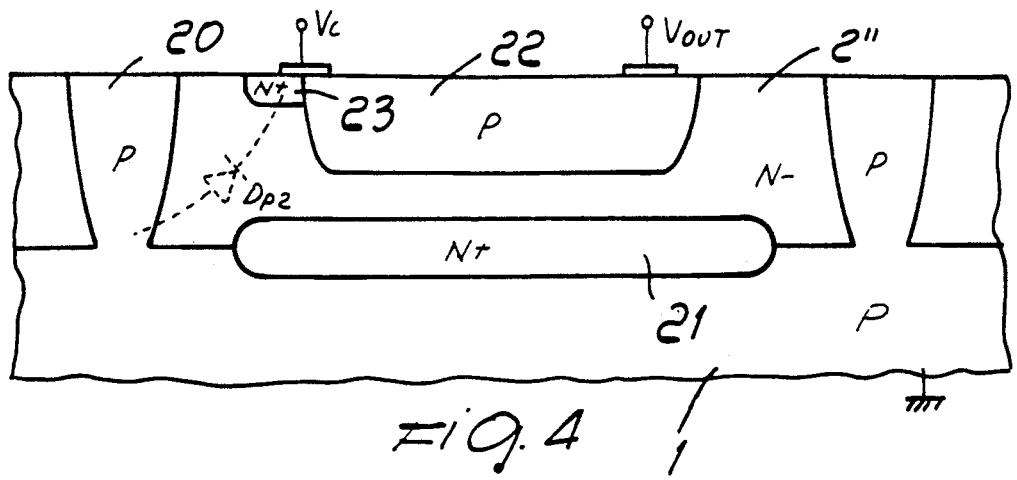
FIGS. 4 and 5 are views of the physical execution of two components of the circuit of FIG. 3.

In the circuit diagram of FIG. 3, the parasite elements associated with the components of the illustrated protection circuit have also been shown in broken lines. In particular, a parasite diode $D_{p2}$ is associated with the resistor $R_4$, whereas the parasite diode $D_{p1}$ is associated with the diode $D_1$. However, said parasite diodes do not compromise the operation of the protection device according to the invention. In fact (see FIG. 4, which illustrates a transverse sectional view of the portion of the silicon chip in which the resistor $R_4$ is executed) the latter is provided by a P-type region 22 which extends inside a portion 2" of the epitaxial layer which is insulated from the rest by means of a P-type region 20 which extends in a ring around the portion 2". A buried layer 21 of the N+ type is provided below the region 22 which constitutes the resistor, whereas an N+-type biasing region 23 extends at one end of the region 22. The figure also illustrates the contacts on which the voltages $V_C$ and $V_{OUT}$ are present. As shown in broken lines in FIG. 4, the biasing region 23 and the substrate 1 (or the insulation ring 20) form the parasite diode $D_{p2}$. However, said diode can never start conducting, since $V_C = -0.35$ V (in general, it is sufficient that $V_C > -0.7$ V).

Figure 5:
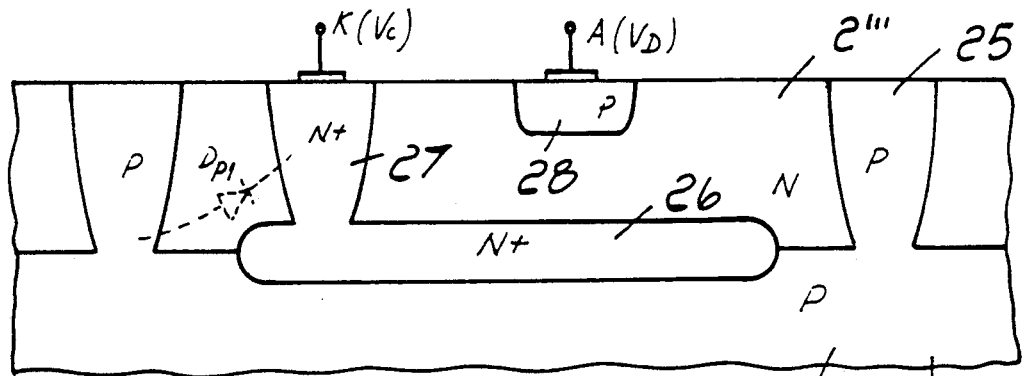

Similarly, the parasite diode $D_{p1}$ associated with the diode $D_1$ is never activated. In fact (see FIG. 5, which illustrates a transverse sectional view of the portion of the silicon chip in which the diode $D_1$ is provided and includes the substrate 1 and the portion 2''' of epitaxial layer which is surrounded by the P-type insulation layer 25) the cathode of the diode, which is constituted by the regions 26 and 27, forms, together with the substrate, the parasite diode $D_{p1}$, which however, since the cathode K of $D_1$ is at the voltage $V_C = -0.35$ V, can never start conducting. In the figure, the P-type region 28 constitutes the anode of $D_1$ (which is set to the voltage $V_D$).

Figure 6:
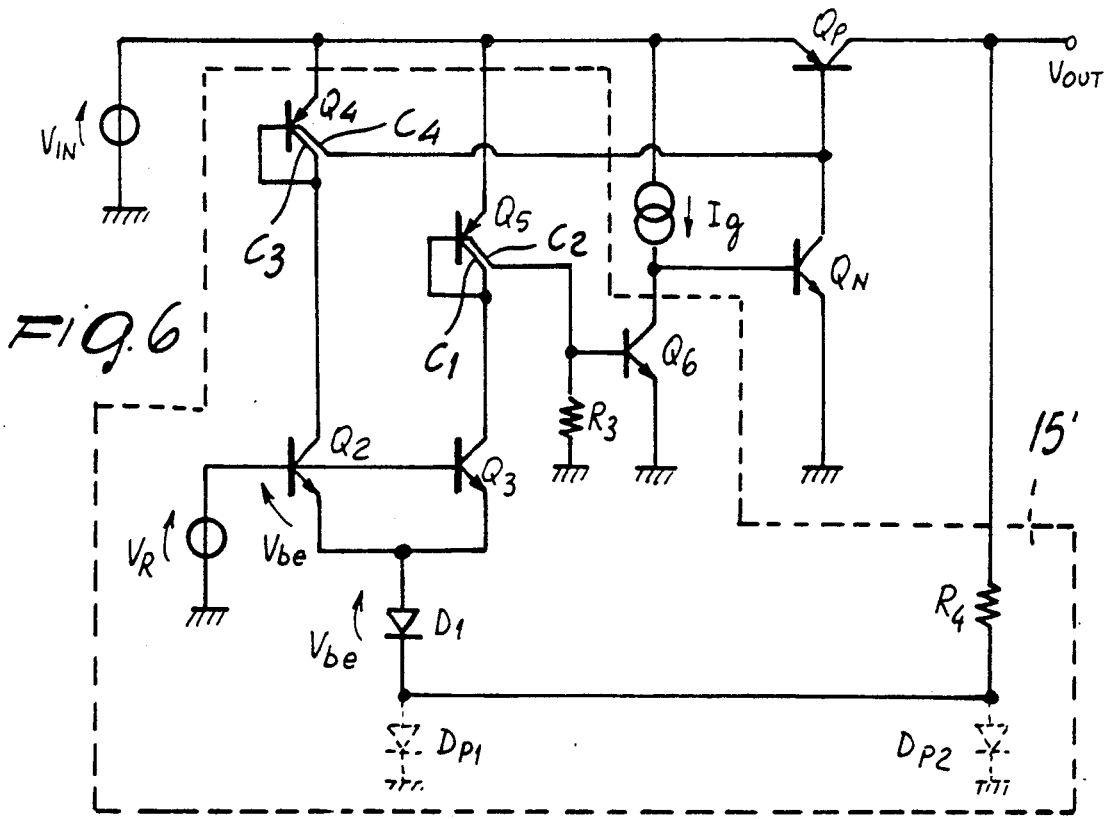

FIG. 6 illustrates a variated embodiment of the circuit of FIG. 3, since the part which generates the voltage reference has been replaced with a generic source of the voltage $V_R$, whereas the other parts of the circuit remain unchanged. With this solution it is possible to switch the transistor $Q_P$ off at any collector voltage $V_{OUT}$ (as long as it is higher than $-0.35$ V) by appropriately choosing the value of the voltage $V_R$. In fact, as soon as the following condition occurs:

$$V_{OUT} < V_R - 2V_{be}$$

the protection circuit 15' intervenes, switching the transistor $Q_P$ off and sending it in practice to $BV_{CBO}$, similarly to what is described for FIG. 3.

The circuit according to the invention not only allows to maximally extend the range of the negative overvoltage on the output, as explained, but has a reliable operation, can be easily integrated and occupies a small area, since it is composed of transistors with a minimal area.

The invention thus conceived is susceptible to numerous modifications and variations, all of which are within the scope of the inventive concept.

All the details may furthermore be replaced with other technically equivalent ones.

We claim:

1. An insulated vertical PNP transistor, having an emitter terminal which defines an input terminal, a collector terminal which defines an output terminal, said collector terminal generating an output voltage, and a base terminal which receives a driving signal, said PNP transistor including a negative overvoltage circuit comprising: an output voltage sensor which is connected to said output terminal, a reference terminal set at a reference voltage, comparator means having a first input connected to said reference terminal, a second input connected to said output voltage sensor and an output which generates an activation signal when the output voltage becomes lower than said reference voltage, switch means which are controlled by said comparator means and are suitable for switching off said insulated vertical PNP transistor upon the reception of said activation signal and a low-impedance circuit which is connected between the emitter and base terminals of said insulated vertical PNP transistor and is activated by said activation signal, in a manner which is suitable for providing for a low-resistivity path between the base and emitter terminals.

2. Insulated transistor including the overvoltage protection circuit according to claim 1, wherein said comparator means comprise a pair of transistors having base terminals which are mutually coupled and connected to said reference terminal, emitter terminals which are mutually coupled and connected to said output voltage sensor, and collector terminals which define said output of the comparator means.

3. Insulated transistor including the overvoltage protection circuit according to claim 2, wherein said emitter terminals of said pair of transistors are connected to said output voltage sensor across a diode.

4. Insulated transistor including the overvoltage protection circuit according to claim 3, wherein said output voltage sensor comprises a resistor.

5. Insulated transistor including the overvoltage protection circuit according to claim 4, wherein said pair of transistors is of the NPN type and said emitters are connected to the anode of said diode.

6. Insulated transistor including the overvoltage protection circuit according to claim 5, wherein said diode is provided as a base-collector diode.

7. Insulated transistor including the overvoltage protection circuit according to claim 6, wherein said switch means comprise a third transistor of the PNP type which is diode-connected, which has a first collector terminal and the base terminal connected to the collector terminal of a first one of said pair of transistors, the emitter terminal connected to said input terminal and a second collector terminal connected to the base terminal of a fourth transistor of the NPN type which has its collector terminal connected to the base terminal of an NPN driving transistor which drives said base terminal of said insulated vertical PNP transistor, said fourth transistor having its emitter terminal connected to the ground.

8. Insulated transistor including the overvoltage protection circuit according to claim 7, wherein said low-impedance circuit comprises a fifth transistor of the NPN type which is diode-connected, which has a first collector terminal and the base terminal connected to the collector terminal of a second one of said pair of transistors, the emitter terminal connected to said input terminal and a second collector terminal connected to the base terminal of said insulated vertical PNP transistor.

9. Insulated transistor including the overvoltage protection circuit according to claim 8, wherein said reference terminal is connected to a voltage source circuit which comprises a sixth transistor the collector terminal whereof is connected to said reference terminal, the emitter terminal whereof is connected to the ground and the base terminal whereof is connected to an intermediate point of a pair of resistors which are respectively connected in series between said reference terminal and the ground, a current source supplying said voltage source circuit.

10. Insulated transistor including the overvoltage protection circuit according to claim 6, wherein said low-impedance circuit comprises a fifth transistor of the NPN type which is diode-connected, which has a first collector terminal and the base terminal connected to the collector terminal of a second one of said pair of transistors, the emitter terminal connected to said input terminal and a second collector terminal connected to the base terminal of said insulated vertical PNP transistor.

11. Insulated transistor including the overvoltage protection circuit according to claim 10, wherein said reference terminal is connected to a voltage source circuit which comprises a sixth transistor the collector terminal whereof is connected to said reference terminal, the emitter terminal whereof is connected to the ground and the base terminal whereof is connected to an intermediate point of a pair of resistors which are respectively connected in series between said reference terminal and the ground, a current source supplying said voltage source circuit.

12. Use of a negative overvoltage protection circuit for an insulated vertical PNP transistor, said insulated transistor comprising:
   an emitter terminal which defines an input terminal;
   a collector terminal which defines an output terminal, said collector terminal generating an output voltage; and
   a base terminal which receives a driving signal, said protection circuit comprising:
   an output voltage sensor which is connected to said output terminal;
   a reference terminal set at a reference voltage;
   comparator means having a first input connected to said reference terminal; a second input connected to said output voltage sensor; and an output which generates an activation signal when the output voltage becomes lower than said reference voltage;
   switch means which are controlled by said comparator means and are suitable for switching off said insulated vertical PNP transistor upon the reception of said activation signal; and
   a low-impedance circuit which is connected between the emitter and base terminals of said insulated vertical PNP transistor and is activated by said activation signal, so as to provide for a low-resitivity path between the base and emitter terminals.

13. An insulated vertical PNP transistor coupled to a negative overvoltage protection circuit, said insulated transistor comprising:
   an emitter terminal which defines an input terminal;
   a collector terminal which defines an output terminal, said collector terminal generating an output voltage; and
   a base terminal which receives a driving signal, and said negative overvoltage protection circuit comprising:
   an output voltage sensor which is connected to said output terminal;
   a reference terminal set at a reference voltage;
   comparator means having a first input connected to said reference terminal; a second input connected to said output voltage sensor; and an output which generates an activation signal when the output voltage becomes lower than said reference voltage;
   switch means which are controlled by said comparator means and are suitable for switching off said insulated vertical PNP transistor upon the reception of said activation signal; and
   a low-impedance circuit which is connected between the emitter and base terminals of said insulated vertical PNP transistor and is activated by said activation signal, so as to provide for a low-resitivity path between the base and emitter terminals.

* * * * *